(12) United States Patent
Gupta et al.

(10) Patent No.: US 12,411,667 B2
(45) Date of Patent: Sep. 9, 2025

(54) METHOD AND SYSTEM FOR PROVIDING FAAS BASED FEATURE LIBRARY USING DAG

(71) Applicant: INNOVACCER INC., San Francisco, CA (US)

(72) Inventors: Shubham Gupta, Bhopal (IN); Sparsh Dutta, Jaipur (IN); Rishika Khandelwal, Jaipur (IN); Paras Gupta, Agra (IN); Vibhuti Agrawal, Bangaluru (IN)

(73) Assignee: INNOVACCER INC., San Francisco, CA (US)

( * ) Notice: Subject to any disclaimer, the term of this patent is extended or adjusted under 35 U.S.C. 154(b) by 255 days.

(21) Appl. No.: 18/143,397

(22) Filed: May 4, 2023

(65) Prior Publication Data

US 2023/0359445 A1 Nov. 9, 2023

(30) Foreign Application Priority Data

May 6, 2022 (IN) .............................. 202211026426

(51) Int. Cl.
*G06F 8/40* (2018.01)
*G06F 8/36* (2018.01)
*G06F 8/51* (2018.01)

(52) U.S. Cl.
CPC . *G06F 8/36* (2013.01); *G06F 8/51* (2013.01)

(58) Field of Classification Search
CPC ........................................................ G06F 8/40
See application file for complete search history.

(56) References Cited

U.S. PATENT DOCUMENTS

| 6,408,294 | B1 | 6/2002 | Getchius ........... G06F 16/24534 |
| 6,484,161 | B1 | 11/2002 | Chipalkatti ............ G06Q 30/02 |
| 7,047,242 | B1 | 5/2006 | Ponte ..................... G06Q 10/00 |
| 7,611,466 | B2 | 11/2009 | Chalana ............... A61B 8/0858 |
| 8,515,939 | B2 | 8/2013 | Chen et al. ............. G06F 17/30 |
| 8,630,878 | B1 | 1/2014 | Kravets et al. ........ G06Q 40/08 |
| 8,849,693 | B1 | 9/2014 | Koyfman ............... G06Q 30/02 |
| 8,977,953 | B1 | 3/2015 | Pierre ................... G06F 40/284 |

(Continued)

FOREIGN PATENT DOCUMENTS

| CN | 109508432 | 3/2019 | .......... G06F 16/955 |
| CN | 109871538 | 6/2019 | ............. G06F 17/27 |

(Continued)

OTHER PUBLICATIONS

U.S. Appl. No. 18/212,562, filed Jun. 21, 2023, Gupta et al.

(Continued)

*Primary Examiner* — Jae U Jeon
(74) *Attorney, Agent, or Firm* — HAYES SOLOWAY P.C.

(57) ABSTRACT

A method and a system for generating required feature output by providing a FaaS (Function-as-a-Service) based feature library using a DAG (Directed Acyclic Graph), are disclosed. A library is configured to store logic codes being generated for a plurality of features and the library is then deployed on a FaaS engine. At least one feature selection configuration from a user is received by the FaaS engine. The DAG implements at least one transformation based on the at least one feature selection configuration, and the FaaS engine thereby generates the required feature output for the user.

12 Claims, 5 Drawing Sheets

(56) References Cited

U.S. PATENT DOCUMENTS

| | | | |
|---|---|---|---|
| 9,292,707 B1 | 3/2016 | Fontecchio | G06F 21/60 |
| 9,355,273 B2 | 5/2016 | Stevens | G06F 21/00 |
| 9,542,393 B2 | 1/2017 | Morton | G06F 16/7844 |
| 9,633,404 B2 | 4/2017 | Chawla et al. | G06F 7/04 |
| 9,727,591 B1 | 8/2017 | Sharma | G06F 16/215 |
| 9,830,476 B2 | 11/2017 | Fontecchio | H04L 9/32 |
| 10,056,078 B1 | 8/2018 | Shepherd | G06F 16/632 |
| 10,147,504 B1 | 12/2018 | Stettin et al. | G16H 50/30 |
| 10,366,346 B2 | 7/2019 | Achin et al. | G06F 15/18 |
| 10,514,949 B1* | 12/2019 | Korda | G06F 9/5072 |
| 10,642,648 B2 | 5/2020 | Ling et al. | G06F 9/48 |
| 10,691,976 B2 | 6/2020 | Rogers et al. | G06K 9/62 |
| 10,789,373 B2 | 9/2020 | Reid et al. | G06F 21/60 |
| 10,810,223 B2 | 10/2020 | Sundararaman et al. | G06F 16/254 |
| 10,885,759 B1 | 1/2021 | Lee et al. | G08B 25/10 |
| 10,887,202 B2 | 1/2021 | Hutchison et al. | H04L 12/26 |
| 10,910,089 B2 | 2/2021 | Austin et al. | G06F 21/62 |
| 10,983,843 B2 | 4/2021 | Duggal et al. | G06F 9/54 |
| 11,474,836 B2 | 10/2022 | Awadallah et al. | G06F 9/448 |
| 11,670,422 B2 | 6/2023 | Basu et al. | G16H 50/70 |
| 11,682,041 B1 | 6/2023 | Xu et al. | G06Q 30/0201 |
| 11,687,940 B2 | 6/2023 | Muthuswamy et al. | G06Q 20/4016 |
| 11,783,260 B2 | 10/2023 | Flumara et al. | G06N 5/04 |
| 2003/0018633 A1 | 1/2003 | Horn | G06F 17/18 |
| 2004/0215629 A1 | 10/2004 | Dettinger | G06F 16/2452 |
| 2005/0065956 A1 | 3/2005 | Brown | G06F 16/252 |
| 2005/0107902 A1 | 5/2005 | Blouin | G06Q 10/087 |
| 2005/0119534 A1 | 6/2005 | Trost | G06F 19/00 |
| 2005/0131778 A1 | 6/2005 | Bennett | G06Q 10/0875 |
| 2006/0041539 A1 | 2/2006 | Matchett | G06Q 10/0639 |
| 2006/0075001 A1 | 4/2006 | Canning | G06F 8/65 |
| 2007/0239694 A1* | 10/2007 | Singh | G06F 16/9024 |
| 2007/0239724 A1 | 10/2007 | Ramer | G06F 16/951 |
| 2008/0147554 A1 | 6/2008 | Stevens et al. | H04L 9/00 |
| 2008/0263187 A1* | 10/2008 | Casey | H04L 67/56 709/223 |
| 2009/0012818 A1 | 1/2009 | Rodgers | G16H 10/65 |
| 2009/0112114 A1 | 4/2009 | Ayyagari et al. | A61B 5/08 |
| 2009/0313232 A1 | 12/2009 | Tinsley | G06Q 30/02 |
| 2010/0121879 A1 | 5/2010 | Greenberg | G06F 16/248 |
| 2010/0199169 A1 | 8/2010 | Gnech | G06F 16/972 |
| 2010/0287162 A1 | 11/2010 | Shirwadkar | G06F 16/3338 |
| 2011/0082712 A1 | 4/2011 | Eberhardt, III et al. | G16Z 99/00 |
| 2012/0083933 A1 | 4/2012 | Subbu et al. | G06F 1/26 |
| 2012/0253793 A1 | 10/2012 | Ghannam | G06F 17/27 |
| 2013/0054010 A1 | 2/2013 | Holman et al. | G06Q 50/01 |
| 2013/0054625 A1 | 2/2013 | Bhagwan et al. | G16H 10/60 |
| 2013/0054695 A1 | 2/2013 | Holman et al. | G09B 19/00 |
| 2013/0197936 A1 | 8/2013 | Willlich | G06Q 50/22 |
| 2013/0246290 A1 | 9/2013 | Courson et al. | G06F 40/205 |
| 2013/0325805 A1 | 12/2013 | Tochilnik | G06F 17/30 |
| 2014/0006061 A1 | 1/2014 | Watanabe | G06Q 30/02 |
| 2014/0149446 A1 | 5/2014 | Kuchmann-Beauger | G06F 17/30389 |
| 2014/0156315 A1 | 6/2014 | Canovi et al. | G06Q 40/08 |
| 2014/0188835 A1 | 7/2014 | Zhang | G06F 17/2705 |
| 2014/0344261 A1 | 11/2014 | Navta | G06F 16/951 |
| 2014/0350954 A1 | 11/2014 | Ellis et al. | G16H 10/60 |
| 2015/0088786 A1 | 3/2015 | Anandhakrishnan | G06N 99/00 |
| 2015/0127379 A1 | 5/2015 | Sorenson | G06F 19/00 |
| 2015/0142807 A1 | 5/2015 | Hoffman et al. | G06N 3/02 |
| 2015/0164430 A1 | 6/2015 | Hu | A61B 5/7264 |
| 2015/0302529 A1 | 10/2015 | Jagannathan | G06Q 40/08 |
| 2015/0363478 A1 | 12/2015 | Haynes | G06F 16/26 |
| 2016/0085915 A1 | 3/2016 | Seow | G06F 19/00 |
| 2016/0098387 A1 | 4/2016 | Bruno | G06F 17/27 |
| 2016/0132969 A1 | 5/2016 | Gunjan et al. | G06Q 40/08 |
| 2016/0147945 A1 | 5/2016 | MacCarthy et al. | G06F 19/00 |
| 2016/0156611 A1 | 6/2016 | Rozman | H04L 29/06 |
| 2016/0162473 A1 | 6/2016 | Cogley | G06F 40/51 |
| 2016/0371453 A1 | 12/2016 | Bowman | G06F 19/00 |
| 2016/0373456 A1 | 12/2016 | Vermeulen | G06F 16/25 |
| 2017/0076046 A1 | 3/2017 | Barnes et al. | |
| 2017/0091162 A1 | 3/2017 | Emanuel | G06F 40/169 |
| 2017/0102693 A1 | 4/2017 | Kidd | G05B 19/41865 |
| 2017/0161372 A1 | 6/2017 | Fernandez | G06F 16/35 |
| 2017/0199928 A1 | 7/2017 | Zhao | G06F 16/24578 |
| 2017/0256173 A1 | 9/2017 | Burford | G09B 5/125 |
| 2017/0279786 A1 | 9/2017 | Peterson et al. | H04L 29/06 |
| 2017/0323485 A1 | 11/2017 | Samec et al. | G06T 19/00 |
| 2017/0337326 A1 | 11/2017 | Zhang et al. | G06F 19/24 |
| 2017/0344646 A1 | 11/2017 | Antonopoulos | H04L 9/008 |
| 2017/0364637 A1 | 12/2017 | Kshepakaran et al. | G06F 19/00 |
| 2017/0371881 A1 | 12/2017 | Reynolds | G06F 16/248 |
| 2018/0025122 A1 | 1/2018 | Schuurkamp et al. | G06F 19/00 |
| 2018/0033279 A1 | 2/2018 | Chong et al. | G08B 21/0453 |
| 2018/0052842 A1 | 2/2018 | Hewavitharana et al. | G06F 17/3043 |
| 2018/0113986 A1 | 4/2018 | Zhu | G06F 19/3418 |
| 2018/0158146 A1 | 6/2018 | Turner | G06Q 40/02 |
| 2018/0158551 A1 | 6/2018 | Bradley et al. | G16H 40/67 |
| 2018/0168464 A1 | 6/2018 | Barnett, Jr. et al. | A61B 5/0205 |
| 2018/0173733 A1 | 6/2018 | Nath et al. | G06F 17/30 |
| 2018/0203978 A1 | 7/2018 | Basu et al. | G16H 50/30 |
| 2018/0210925 A1 | 7/2018 | Raghavan et al. | G06F 17/30 |
| 2018/0225320 A1 | 8/2018 | Saini | G06F 16/215 |
| 2018/0232443 A1 | 8/2018 | Delgo | G06Q 30/06 |
| 2018/0367557 A1 | 12/2018 | Brown | H04L 63/1425 |
| 2019/0012390 A1 | 1/2019 | Nishant | G06N 20/00 |
| 2019/0013093 A1 | 1/2019 | Slepian et al. | G16H 40/20 |
| 2019/0050445 A1 | 2/2019 | Griffith | G06K 9/6262 |
| 2019/0114511 A1 | 4/2019 | Gao et al. | G06K 9/62 |
| 2019/0156198 A1 | 5/2019 | Mars | G06N 20/20 |
| 2019/0179820 A1 | 6/2019 | El Kaed | G06F 16/2471 |
| 2019/0180757 A1 | 6/2019 | Kothari | G10L 17/005 |
| 2019/0244129 A1 | 8/2019 | Tabuchi et al. | G06F 9/5033 |
| 2019/0259108 A1 | 8/2019 | Bongartz et al. | G06Q 50/02 |
| 2019/0304582 A1 | 10/2019 | Blumenthal et al. | G16H 15/00 |
| 2019/0311299 A1 | 10/2019 | Lindner | G06F 16/248 |
| 2019/0311300 A1 | 10/2019 | Lindner | G06N 20/00 |
| 2019/0311372 A1 | 10/2019 | Lindner | G06N 20/00 |
| 2019/0318272 A1 | 10/2019 | Sassin | G06N 99/005 |
| 2019/0324964 A1 | 10/2019 | Shiran | G06N 20/00 |
| 2020/0004749 A1 | 1/2020 | Slezak | G06F 16/2462 |
| 2020/0067789 A1 | 2/2020 | Khuti et al. | H04L 41/16 |
| 2020/0074461 A1 | 3/2020 | Derosa-Grund | G06Q 20/38 |
| 2020/0092099 A1 | 3/2020 | Austin et al. | H04L 9/14 |
| 2020/0117434 A1 | 4/2020 | Biskup et al. | G06F 8/60 |
| 2020/0160955 A1 | 5/2020 | Hansen et al. | G16H 15/00 |
| 2020/0175028 A1 | 6/2020 | Kozlowski et al. | G06F 16/252 |
| 2020/0211692 A1 | 7/2020 | Kalafut et al. | G16H 30/20 |
| 2020/0257611 A1 | 8/2020 | Hortala et al. | G06F 11/36 |
| 2020/0294642 A1 | 9/2020 | Bostic et al. | G16H 50/20 |
| 2020/0387623 A1 | 12/2020 | Bayon et al. | G06F 21/6227 |
| 2021/0090694 A1 | 3/2021 | Colley et al. | G16H 10/60 |
| 2021/0174135 A1* | 6/2021 | Liu | G06V 10/757 |
| 2021/0272696 A1 | 9/2021 | DeMazumder | G16H 15/00 |
| 2021/0287656 A1 | 9/2021 | Bonafonte et al. | G10L 13/10 |
| 2021/0319796 A1 | 10/2021 | Wang et al. | G10L 15/26 |
| 2021/0374143 A1 | 12/2021 | Neill | G06F 16/24568 |
| 2021/0398024 A1 | 12/2021 | Pargunarajan et al. | G06N 20/00 |
| 2022/0004443 A1 | 1/2022 | Duggal et al. | G06F 9/54 |
| 2022/0075772 A1 | 3/2022 | Korpman et al. | G06F 16/9024 |
| 2022/0121651 A1 | 4/2022 | Korpman et al. | G06F 16/23 |
| 2022/0164337 A1 | 5/2022 | Korpman et al. | G06F 40/205 |
| 2022/0180985 A1 | 6/2022 | Connely, IV et al. | |
| 2022/0215948 A1 | 7/2022 | Bardot | G16H 40/40 |
| 2022/0262517 A1 | 8/2022 | Van Sickle et al. | G16H 50/20 |
| 2022/0269732 A1 | 8/2022 | Pang et al. | G06F 9/3555 |
| 2022/0399112 A1 | 12/2022 | Bardot | G16H 40/40 |
| 2023/0087478 A1 | 3/2023 | Jayaram et al. | G06F 16/2365 |
| 2023/0119881 A1 | 4/2023 | Makhija et al. | G06V 30/19147 |
| 2023/0123620 A1 | 4/2023 | Simpson | G06F 3/0482 |
| 2023/0139172 A1 | 5/2023 | Booth et al. | G16H 10/60 |
| 2023/0142594 A1 | 5/2023 | Eberhardt et al. | G16H 50/20 |
| 2023/0153722 A1 | 5/2023 | Simpson | G06Q 40/04 |
| 2023/0207126 A1 | 6/2023 | Leon et al. | G06N 20/00 |
| 2023/0229999 A1 | 7/2023 | Fowles et al. | G06Q 10/063 |

(56) References Cited

U.S. PATENT DOCUMENTS

| | | |
|---|---|---|
| 2023/0252020 A1 | 8/2023 | Korpman et al. ... G06F 16/9027 |
| 2023/0252382 A1 | 8/2023 | Simpson ............... G06Q 50/02 |
| 2023/0260045 A1 | 8/2023 | Nawab et al. ......... G06V 10/82 |
| 2023/0262118 A1 | 8/2023 | Jayaram et al. ....... G06Q 40/06 |
| 2023/0281546 A1 | 9/2023 | Markison ............. G06F 18/241 |
| 2023/0325894 A1 | 10/2023 | Nilekar ............. G06Q 30/0601 |
| 2023/0326568 A1 | 10/2023 | Greebel et al. ........ G16H 50/70 |
| 2023/0326577 A1 | 10/2023 | Prince et al. .......... G16H 20/70 |
| 2023/0350901 A1 | 11/2023 | Neill ................. G06F 16/24568 |
| 2023/0376532 A1 | 11/2023 | McCarthy et al. ..... G06F 16/84 |
| 2023/0409966 A1 | 12/2023 | Linder .................. G06F 16/248 |

FOREIGN PATENT DOCUMENTS

| | | | |
|---|---|---|---|
| CN | 110245676 | 9/2019 | ............... G06K 9/62 |
| CN | 110998532 | 4/2020 | ............... G06F 9/50 |
| CN | 112262368 | 1/2021 | ............... G06F 8/30 |
| JP | 2004-318565 | 11/2004 | ............ G06F 17/60 |
| KR | 10-1999152 | 7/2019 | ............ G06F 17/27 |
| WO | WO 2012/023136 | 2/2012 | ............ G01N 7/00 |
| WO | WO 2012/051389 | 4/2012 | ............. G06F 7/00 |
| WO | WO 2017/161403 | 9/2017 | ............ G06Q 30/02 |
| WO | WO 2018/057647 | 3/2018 | ............... C12Q 1/68 |
| WO | WO 2018/166853 | 9/2018 | ............ G16H 10/60 |
| WO | WO/2020150228 | 7/2020 | ............ G16H 10/60 |
| WO | WO 2020/219971 | 10/2020 | ............... G06N 3/04 |
| WO | WO 2021/036070 | 3/2021 | ............. G06F 16/22 |

OTHER PUBLICATIONS

EPO Supplementary Search Report issued in EP20754922.1, dated Oct. 4, 2022, 12 pgs.

International Search Report and Written Opinion issued in PCT/US2020/13802 dated Mar. 25, 2020 (10 pgs).

International Search Report and Written Opinion issued in PCT/US2020/16827 dated Apr. 22, 2020 (7 pgs).

International Search Report and Written Opinion issued in PCT/US2022/045784, dated Feb. 8, 2023, 10 pgs.

International Search Report and Written Opinion issued in PCT/US2022/050117 dated Mar. 3, 2023 (8 pgs).

International Preliminary Report on Patentability issued in PCT/US2020/013802, dated Aug. 10, 2021, 7 pgs.

International Preliminary Report on Patentability issued in PCT/US2020/016827, dated Aug. 10, 2021, 5 pgs.

International Search Report and Written Opinion issued in PCT/US2022/050616 dated Mar. 27, 2023 (7 pgs).

International Search Report and Written Opinion issued in PCT/US2023/021014, dated Jul. 28, 2023, 9 pgs.

Notice of Allowance issued in U.S. Appl. No. 16/387,016, dated Feb. 10, 2020 (14 pgs).

Notice of Allowance issued in U.S. Appl. No. 16/363,897, dated Jul. 30, 2020 (18 pgs).

Notice of Allowance issued in application No. 16/743, 175, dated Jul. 31, 2020 (18 pgs).

Office Action issued in U.S. Appl. No. 16/387,016, dated Jun. 25, 2019 (11 pgs).

Office Action issued in U.S. Appl. No. 16/387,016, dated Oct. 17, 2019 (17 pgs).

Office Action issued in U.S. Appl. No. 16/363,897, dated Sep. 9, 2019 (38 pgs).

Office Action issued in U.S. Appl. No. 16/363,897, dated Feb. 26, 2020 (36 pgs).

Office Action issued in U.S. Appl. No. 16/743,175 dated Mar. 23, 2020 (21 pgs).

Office Action issued in India Application No., 201921043365, dated Dec. 10, 2021, 7 pgs.

Arjona et al. "Triggerflow: Trigger-based orchestration of serverless workflows", Future Generation Computer Systems 124, 2021, pp. 215-229.

Carver et al. "In Search of a Fast and Efficient Serverless DAG Engine", George Mason University, Nov. 18, 2019, 10 pgs.

Datavant—Connecting the world's health data, slide presentation, https://www.healthra.org/wp-content/uploads/2018/10/Datavant-Overivew-Deck_Prepared-for-HRA_v20181002-1.pdf Oct. 2018, 15 pgs.

"De-identification and re-identification of PII in large-scale datasets using Cloud DLP", Cloud Architecture Center, https://cloud.google.com/architecture/de-identification-re-identification-pii-using-cloud-dLp, Aug. 11, 2022, 9 pgs.

Morid et al., "Supervised Learning Methods for Predicting Health-care Costs: Systematic Literature Review and Empirical Evaluation", 2018, AMIA Annu Symp Proc. pp. 1312-1321.

Shin, "Encoding Database Schemas with Relation-Aware Self-Attention for Text-to-SQL Parsers", arXiv: 1906.11790v1 [cs.LG] Jun. 27, 2019, 10 pgs.

Suleiman et al., "Deep Learning Based Abstractive Text Summarization: Approaches, Datasets, Evaluation Measures, and Challenges", Hindawi, Mathematical Problems in Engineering, vol. 2020, Article ID 9365340, Aug. 24, 2020, 29 pgs.

Wang et al. "Detecting Transportation Modes Based on LightBGM Classifier from GPS Trajectory Data", 2018 26th International Conference on Geoinformatics, Kunming, 2018, pp. 1-7.

Zhang et al. "Health reform and out-of-pocket payments: lessens from China", Health Policy and Planning, vol. 29, Issue 2, Mar. 2014, pp. 217-226, https://doi.org/10.1093/heapol/czt006.

Iyengar et al. "A Trusted Healthcare Data Analytics Cloud Platform", 2018 IEEE 38th International Conference on Distributed Computing Systems (ICDCS), Vienna, 2018, pp. 1238-1249.

U.S. Appl. No. 18/212,562, filed Jun. 21, 2023, Singh.

U.S. Appl. No. 18/540,583, filed Dec. 14, 2023, Lakshman et al.

International Search Report and Written Opinion issued in PCT/US2023/025897, dated Sep. 21, 2023, 10 pgs.

Office Action issued in U.S. Appl. No. 17/960,565, dated Aug. 22, 2024, 17 pgs.

Notice of Allowance issued in U.S. Appl. No. 17/991,554, dated Sep. 26, 2024, 9 pgs.

U.S. Appl. No. 17/960,565, filed Oct. 5, 2022, Kittel.

U.S. Appl. No. 17/988,505, filed Nov. 16, 2022, Gupta et al.

U.S. Appl. No. 17/991,554, filed Nov. 21, 2022, Kumar et al.

U.S. Appl. No. 18/420,434, filed Jan. 23, 2024, Raghuvansh et al.

"Artificial Intelligence for the Data-Driven Enterprise" *Informatica*, informatica.com, 2023, 36 pages.

Gill, Navdeep Singh "Big Data Ingestion Tools and its Architecture | The Advanced Guide" Xenonstack A Stack Innovator, Apr. 29, 2023, https://www.xenonstack.com/blog/big-data-ingestion, 16 pages.

He et al., "The practical implementation of artificial intelligence technologies in medicine" *Nat Med*, Jan. 2019; 25(1):30-36, 15 pages.

Kaur et al., "AI based HealthCare Platform for Real Time, Predictive and Prescriptive Analytics using Reactive Programming" *Journal of Physics: Conference Series* 933 (2018), 13 pages.

Krugman, Brandon, "Converting Medical Service Provider Data into a Unified Format for Processing" (2015).*Master's Theses* (2009 -). Paper 322. http://epublications.marqutte.edu/these_open/322, 50 pages.

Wilson et al., "Case-Based Decision Support for Intelligent Patient Knowledge Management", 3[rd]Intl. IEEE Conference, Sep. 2006, 6 pgs.

* cited by examiner

METHOD AND SYSTEM FOR PROVIDING FAAS BASED FEATURE LIBRARY USING DAG

CROSS REFERENCE TO RELATED APPLICATION

This application claims benefit of India Application Serial No. 202211026426 filed May 6, 2022, the entire disclosure of which is incorporated herein by reference.

TECHNICAL FIELD

The present subject matter relates to data processing and analytics, particularly to methods and systems for providing a FaaS (Function as a Service) based feature library using a Directed Acyclic Graph (DAG).

BACKGROUND

Function as a Service (FaaS) provides a platform to software developers to create, execute and manage functionalities of software applications. FaaS platform allows the developers to write multiple functions based on requirements, which can then be executed in response to an event. Many organizations implement FaaS as an internal tool kit for generating data as per their business rules and requirements.

During the course of software application development and maintenance, the developers may need to incorporate various features as per business requirements, and accordingly logic codes may be written to accommodate the features as required. Any change in the existing feature may further require the logic codes to be written or updated. Transformation of relevant feature variables from input data may accordingly be carried out to address the constant requirements of features addition and modification. Using a FaaS platform, multiple functions can be called from one to another. This enables the software developers to use existing function without requiring writing the code for any given functionality each time. However, FaaS functions typically implement only standard input and may generate only standard output data. Business requirements may be provided as a set configurations or standard rules to generate the output data. Also, the functions to be called to generate the output may not be available or stored at one location.

Thus, a heretofore unaddressed need exists in the industry to address the aforementioned deficiencies and inadequacies.

SUMMARY

In order to provide a holistic solution to the above-mentioned limitations, it is necessary to provide a FaaS based feature library that can be accessed as a single library to fetch features and logic codes of the selected features.

An object of the present subject matter is to provide a FaaS based feature library using a directed acyclic graph (DAG).

Another object of the present subject matter is to facilitate a user to perform a dynamic selection of input and dynamic generation of output.

Yet another object of the present subject matter is to provide a unified location for accommodating feature engineering logic to be reused by the developers.

Yet another object of the present subject matter is to provide a unified location for a FaaS based feature library to be used for analytics and predictive analytics.

According to an embodiment of the present subject matter, there is provided a method for generating required feature output by providing a FaaS (Function-as-a-Service) based feature library using a DAG (Directed Acyclic Graph). The method comprises: configuring a processing unit, the processing unit executing a plurality of computer instructions stored in a memory for: configuring a feature library to store logic codes generated for a plurality of features; deploying the feature library on a FaaS engine; receiving, by the FaaS engine, at least one feature selection configuration from a user; using general external raw data adaptors to collect required data, by the FaaS engine, as per configuration with at least one selected feature; using the DAG for producing at least one transformation, on collected raw data, based on the at least one feature selection configuration; and generating the required feature output based on the at least one transformation.

According to an embodiment of the present subject matter, each of the plurality of features is derived from at least one set of data available in at least one raw data source.

According to an embodiment of the present subject matter, the FaaS engine has access to the plurality of raw data sources to extract the at least one set of data for deriving the plurality of features.

According to an embodiment of the present subject matter, the plurality of features includes raw data and/or developed features.

According to an embodiment of the present subject matter, a new tag for the stored feature is released for facilitating new runs of the stored features.

According to an embodiment of the present subject matter, the stored features are to be selected using a configurable input for future runs.

According to an embodiment of the present subject matter, a system is provided for generating required feature output by providing a FaaS (Function-as-a-Service) based feature library using a DAG (Directed Acyclic Graph), the system comprising: a processing unit, the processing unit configured to execute a plurality of computer instructions stored in a memory for: configuring a feature library to store logic codes generated for a plurality of features; deploying the feature library on a FaaS engine; receiving, by the FaaS engine, at least one feature selection configuration from a user; using general external raw data adaptors collect required data, by the FaaS engine, as per configuration with at least one selected feature; using the DAG for producing at least one transformation, on collected raw data, based on the at least one feature selection configuration; and generating the required feature output based on the at least one transformation.

The afore-mentioned objectives and additional aspects of the embodiments herein will be better understood when read in conjunction with the following description and accompanying drawings. It should be understood, however, that the following descriptions, while indicating preferred embodiments and numerous specific details thereof, are given by way of illustration and not of limitation. This section is intended only to introduce certain objects and aspects of the present invention, and is therefore, not intended to define key features or scope of the subject matter of the present invention.

BRIEF DESCRIPTION OF THE DRAWINGS

The figures mentioned in this section are intended to disclose exemplary embodiments of the claimed system and method. Further, the components/modules and steps of a process are assigned reference numerals that are used throughout the description to indicate the respective components and steps. Other objects, features, and advantages of the present invention will be apparent from the following description when read with reference to the accompanying drawings:

Like reference numerals refer to like parts throughout the description of several views of the drawings.

DETAILED DESCRIPTION

This section is intended to provide explanation and description of various possible embodiments of the present invention. The embodiments used herein, and various features and advantageous details thereof are explained more fully with reference to non-limiting embodiments illustrated in the accompanying drawings in the following description. The examples used herein are intended only to facilitate an understanding of ways in which the embodiments herein may be practiced and to further enable the person skilled in the art to practice the embodiments used herein. Also, the examples/embodiments described herein should not be construed as limiting the scope of the embodiments herein. Corresponding reference numerals indicate corresponding parts throughout the drawings. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

The specification may refer to "an", "one", "different" or "some" embodiment(s) in several locations. This does not necessarily imply that each such reference is to the same embodiment(s), or that the feature only applies to a single embodiment. Single features of different embodiments may also be combined to provide other embodiments.

The present subject matter discloses provisions for generating required feature outputs by providing a FaaS (Function-as-a-Service) based feature library using a DAG (Directed Acyclic Graph). The FaaS based feature library is configured to store logic codes. The logic codes are generated for a plurality of features as per business requirements. Thereafter, the library may be deployed on a FaaS engine. The user provides to the FaaS engine, at least one feature selection configuration. The DAG implements at least one transformation based on the at least one feature selection configuration, and the FaaS engine thereby generates the required feature output for the user.

As used herein, 'processing unit' is an intelligent device or module, that is capable of processing digital logics and program instructions for generating required feature outputs, according to the embodiments of the present subject matter.

As used herein, 'repository' or 'storage unit' refers to a local or remote memory device; docket systems; databases; capable to store information including, data, metadata, data source information, business rules, business requirements etcetera. The storage unit may include a database, a cloud storage, a remote database, a local database.

As used herein, 'features' are the set of data which are derived from set of other existing data, such as raw data.

As used herein, 'user device' is a smart electronic device capable of communicating with various other electronic devices and applications via one or more communication networks. Examples of said user device include, but not limited to, a wireless communication device, a smart phone, a tablet, a desktop, a laptop, etcetera. The user device comprises: an input unit to receive one or more input data; an operating system to enable the user device to operate; a processing unit to process various data and information; a memory unit to store initial data, intermediary data, and final data. The user device may also include an output unit having a graphical user interface (GUI).

As used herein, 'module' or 'unit' refers to a device, a system, a hardware, a computer application configured to execute specific functions or instructions pertaining to generation of required feature outputs according to the embodiments of the present subject matter. The module or unit may include a single device or multiple devices configured to perform specific functions according to the present subject matter disclosed herein.

Terms such as 'connect', 'integrate', 'configure', and other similar terms include a physical connection, a wireless connection, a logical connection, or a combination of such connections including electrical, optical, RF, infrared, or other transmission media, and include configuration of software applications to execute computer program instructions, as specific to the presently disclosed embodiments, or as may be obvious to a person skilled in the art.

Terms such as 'send', 'transfer', 'transmit' and 'receive', 'collect', 'obtain', 'access' and other similar terms refers to transmission of data between various modules and units via wired or wireless connections across a communication network.

Figure 1:
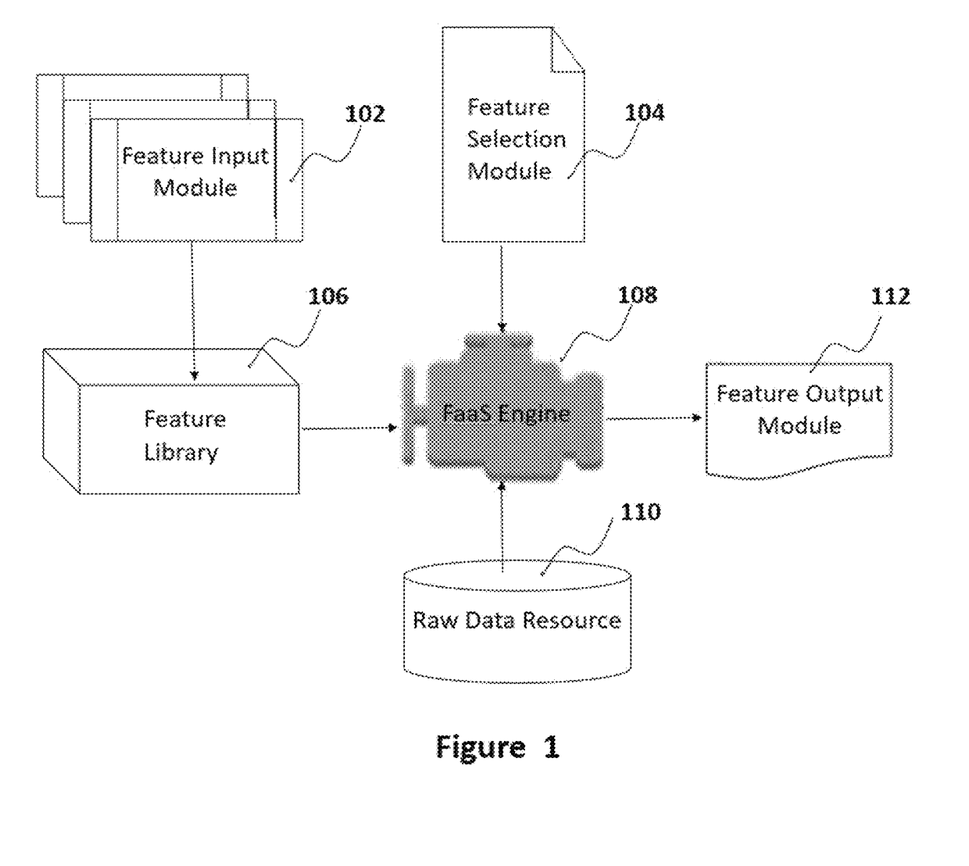
FIG. 1 illustrates a system architecture, according to an exemplary embodiment of the present subject matter.

FIG. 1 illustrates architecture of a system, according to an exemplary embodiment of the present subject matter. The system according to the present subject matter comprises a plurality of components. For example, and by no way limiting the scope of the present subject matter, the system includes a feature input module 102, a feature selection module 104, a feature library 106, a FaaS engine 108, at least one raw data resource 110 and a feature output module 112.

According to an embodiment of the present subject matter, the system is provided for generating required feature output by providing a FaaS (Function-as-a-Service) based feature library using a DAG (Directed Acyclic Graph). A processing unit is configured for executing a plurality of computer instructions stored in a memory for configuring the feature library to store logic codes generated for a plurality of features. Further, the feature library 106 may be deployed on the FaaS engine 108. The FaaS engine 108 may receive at least one feature selection configuration from a user via the feature selection module 104. The DAG is used for implementing at least one transformation based on the at least one feature selection configuration and thereby generating the required feature output based on the at least one transformation.

The feature library 106 contains the plurality of features based on business requirements of a given organization. As mentioned earlier, features are the set of data which are derived from set of other existing data, such as raw data. Once the features are received as per the business requirements, corresponding logic codes may be written by a developer and stored. The feature library 106 thus stores the corresponding logic codes of each of the plurality of features. The features are written in a standard library, which includes a combination of raw value or developed features in the feature development pipeline. Further, the users are facilitated to access the feature library 106, which is a single unified library or repository that allows the user to reuse the feature engineering logics or codes stored therein. This facilitates the user in reducing rework as the users only need to access the single library to fetch the features and logic codes of the selected features.

The FaaS engine 108 may be used as an internal tool kit for generating data for any organization based on specific business rules and requirements. For example, in the field of health sector, various data associated with patients may be required to be processed to analyse various parameters such as health status, diagnosis, risks, line of treatment etcetera. Based on specific business rules and requirements, the features may be derived. There may be different products for any organization which may use their own business rules to generate specific features and accordingly create output to be shared with respective clients. The FaaS engine 108 may be configured accordingly to comply with the business rules and requirements of the organization.

The FaaS engine 108 is configured to provide a platform for generating required features dynamically. The features may be derived data from a set of existing data. The set of existing data may belong to raw data stored in the at least one raw data resource 110. The at least one raw data resource 110 may be a relational database and/or a non-relational database, wherein the data may be stored in rows and columns. The at least one raw data resource 110 may include at least one of: a database, API (application programming interface), a flat file, RPC call (Remote Procedure Call) etc. For example, raw data may include date of birth of a person, which may be used to derive a required feature, such as age of the person or year of birth of that person. Thus, features may be derived from the existing set of data as required by the developer.

According to the embodiments of the present subject matter, the feature selection module 104 facilitates the users or developers to decide what all features are required to be generated. The user is provided with the ability to create new feature or remove old features. Depending upon complete set of features, the user can decide to pick only the required features at a time. For example, the user may decide to select 'K' features out of 'N' number of features and remaining features need not be pulled out. Thus, the user is facilitated to provide, via the feature selection module 104, the inputs to the FaaS engine 108 in a dynamic manner, wherein only required features may be selected for the input. Accordingly, dynamic output may be generated by the FaaS engine 108. Thus, in addition to the standard operation of FaaS, where standard inputs are given and standard outputs are generated, the embodiments of the present subject matter facilitate in receiving dynamic inputs and generating dynamic outputs. The produced output feature data may be stored in the feature output module 112. The feature output module 112 is configured as a data chest to store the feature output. The stored feature output data may be used for analytics and predictive analytics by the developers, analysts, and decision scientists.

Figure 2:
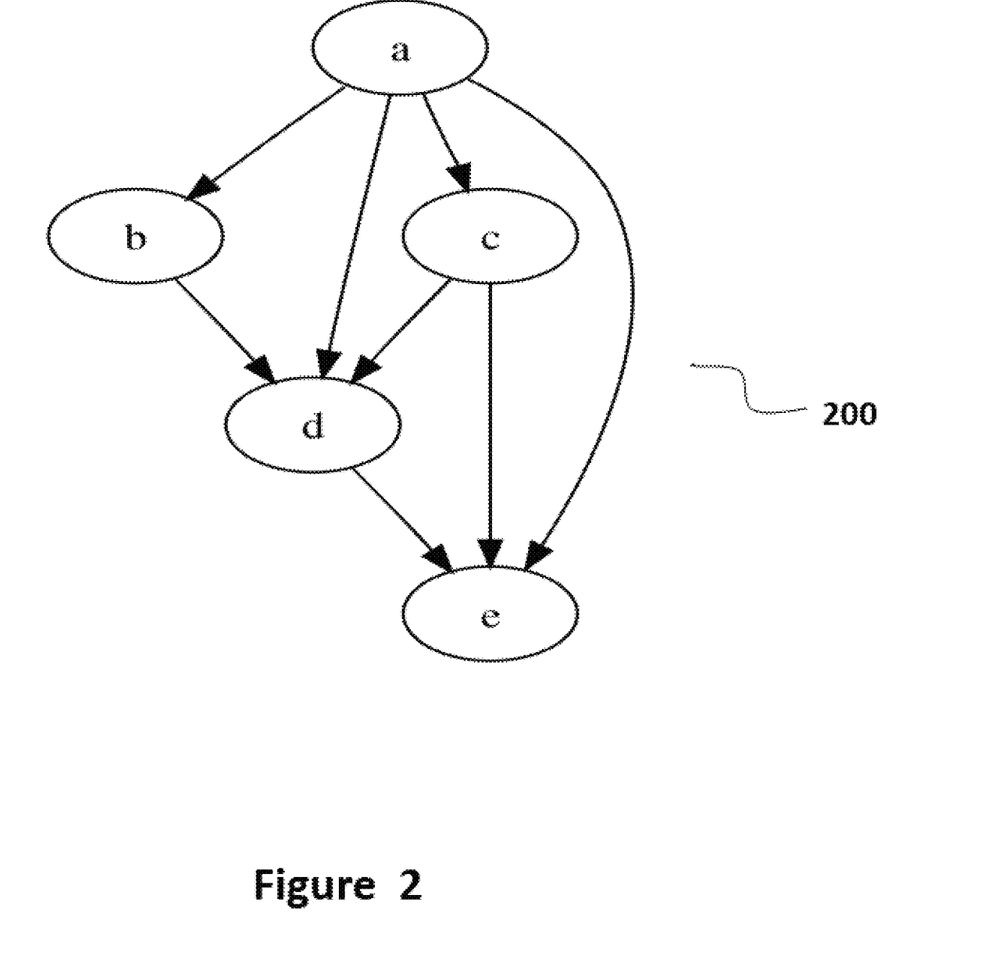
FIG. 2 is a typical illustration of a directed acyclic graph (DAG).

FIG. 2 is a typical illustration of a directed acyclic graph (DAG) 200. The directed acyclic graph (DAG) 200 is a directed graph with no directed cycles. It represents a type of data structure wherein a dynamic DAG flow is created based on the requirement of the Application/API user. DAG 200 represents non-repetitive paths that is followed by every program to reach a goal and obtain an output. As shown in the figure, 'a', 'b', 'c', 'd', 'e' represents the processing nodes, also called as transformation nodes. These nodes transform or derive the selected inputs into required output features. The transformation configuration is predefined by the user or the developer. Based on the configuration, the output is generated for a given selection of inputs. For example, if a user requires output at node 'd', then a configuration may be predefined by the user in the code to indicate what could be the dependencies to get the output at 'd'. If the output is required from 'b' or 'c' or 'a', then automatically nodes 'b', 'c', and 'a' will be activated. Based on active nodes, the DAG based configuration decides the order for execution for output and activates the required nodes. The nodes which are not required need not be activated. The DAG based configuration may be implemented to generate required feature output by the users and is illustrated in FIG. 3.

Figure 3:
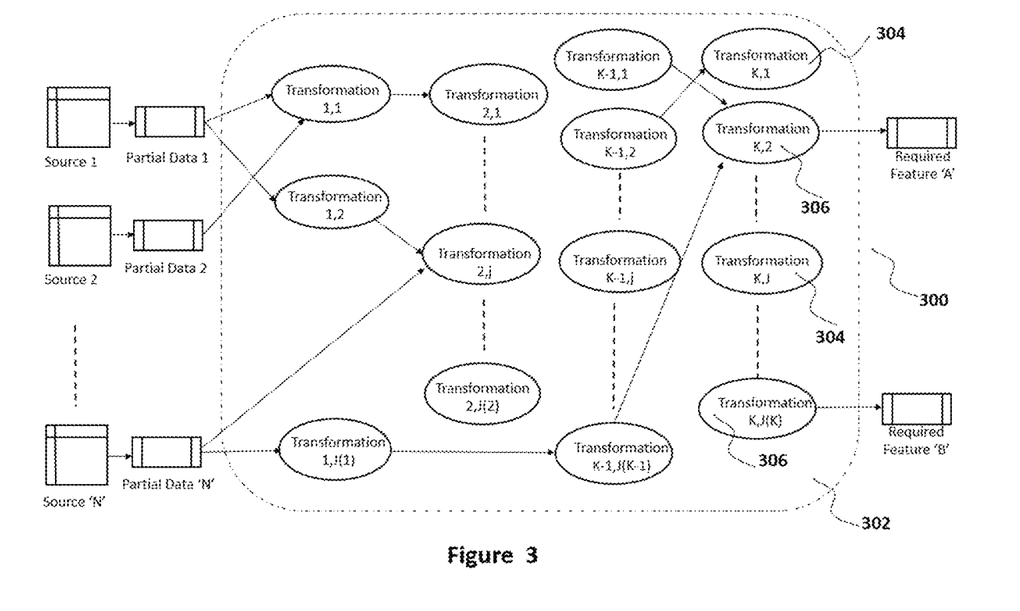
FIG. 3 illustrates DAG nodes activation based on required feature configuration, according to an exemplary embodiment of the present subject matter.

FIG. 3 illustrates DAG nodes activation 300 based on required feature configuration, according to an exemplary embodiment of the present subject matter. The raw data may be pulled from 'N' number of sources (or the raw data resource 110). The raw data may be arranged in a relational or non-relational database. The 'N' number of data sources facilitates the user to access the available data. Depending upon the predefined configuration for features required by the users, the nodes will be activated. Partial data from corresponding source data may be pulled for DAG implementation. The DAG feature flow map 302 for DAG nodes activation based on required feature configuration. The DAG nodes transform or derive the selected features into required output features. The transformation configuration may be predefined by the user or the developer. DAG implementation logic selects and pulls only required columns at once. Each node in the DAG feature flow map 302 represents a task, and edges define dependencies among the tasks. For example, the active nodes are represented by the node 'Transformation 1,1' and the node 'Transformation 1,2' which are responsible to produce the required outputs. The non-active nodes are represented by the node 'Transformation K,1' 304 and the node 'Transformation K,j'304, for example. Further, the output node is represented by the node 'Transformation K, J(K) 306' in the figure.

Depending upon the configuration, the active nodes are used to generate the required output feature. For example, as shown in the figure, 'Transformation K,2' 306 is the output node from where the required output 'Feature A' may be generated. similarly, 'Transformation K, J(K)' 306 is the output node from where the required output 'Feature B' may be generated. If a user wants output from node 'Transformation K,2' 306, then it will be checked what other nodes are actually responsible to generate the required output 'Feature A'. The other responsible nodes are identified automatically by the process of backtracking which is predefined in the codes. Accordingly, the identified responsible nodes are activated. Once the back tracing process is completed, the FaaS engine 108 pulls the data that is needed to generate the required output, i.e., 'Feature A'.

As shown in the figure, there may be no master flow to obtain a required output. Instead, there are one or more pathways which the DAG flow 302 can take and a dynamic DAG flow may be created based on the requirement of the application/API user. Every node is self-aware about its dependencies like raw relational and non-relational tables and other node output dependencies. The features can be varied depending on the design of the node and DAG flow can be created on its own. New features may be added to the existing flow because of the modularity and abstract nature of the node. DAG implementation logic selects and pulls only required data from the required columns at once. The features may be generated dependent on other features based on the flow of development.

Figure 4:
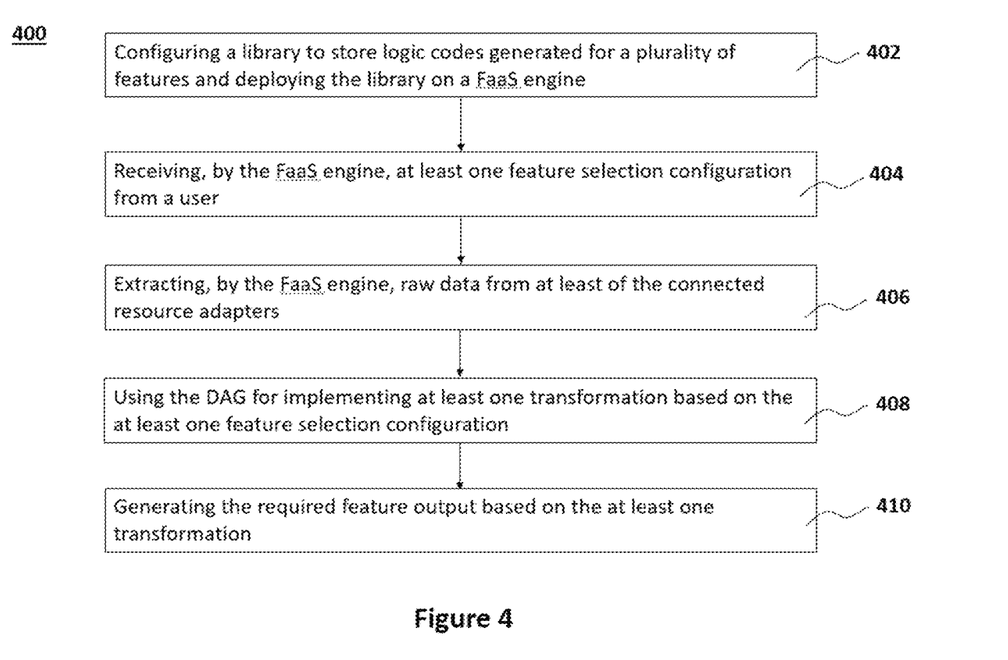
FIG. 4 illustrates a flowchart of a method for generating required feature output, according to an exemplary embodiment of the present subject matter.

FIG. 4 illustrates a flowchart 400 of a method for generating the required feature output, according to an exemplary embodiment of the present subject matter.

At step 402, a feature library 106 may be configured to store logic codes generated for a plurality of features and deploying the library on a FaaS engine 108. A processing unit may be configured to execute a plurality of computer instructions stored in a memory for configuring a library to store logic codes generated for a plurality of features. The plurality of features may include raw data and/or developed features. Further, the feature library 106 or repository may be deployed on the FaaS engine 108. Each of the plurality of features is derived from at least one set of data available in the at least one of the raw data sources. The FaaS engine 108 may receive at least one feature selection configuration from a user via the feature selection module 104. The DAG is used for implementing at least one transformation based on the at least one feature selection configuration and thereby generating the required feature output based on the at least one transformation.

At step 404, the FaaS engine 108 may receive at least one feature selection configuration from a user. The FaaS engine 108 is provided with an access to the plurality of raw data sources to extract the at least one set of data for deriving the plurality of features.

At step 406, general external raw data adaptors or resource adapters are used to collect, or extract required data, by FaaS engine, as per configuration with the at least one selected feature. The resource adapters may be connected to the FaaS engine.

At step 408, the DAG implementation logic may be used for producing at least one transformation based on the at least one feature selection configuration.

At step 410, the required feature output may be generated based on the at least one transformation. The generated output feature may be stored in the data chest or repository, or may be shared via secured network gateways, from where it can be used for analytics/predictive analytics. Thereafter, a new tag for the stored feature may be released for facilitating new runs of the stored features. Also, the stored features can be selected using any configurable input for future runs.

Figure 5:
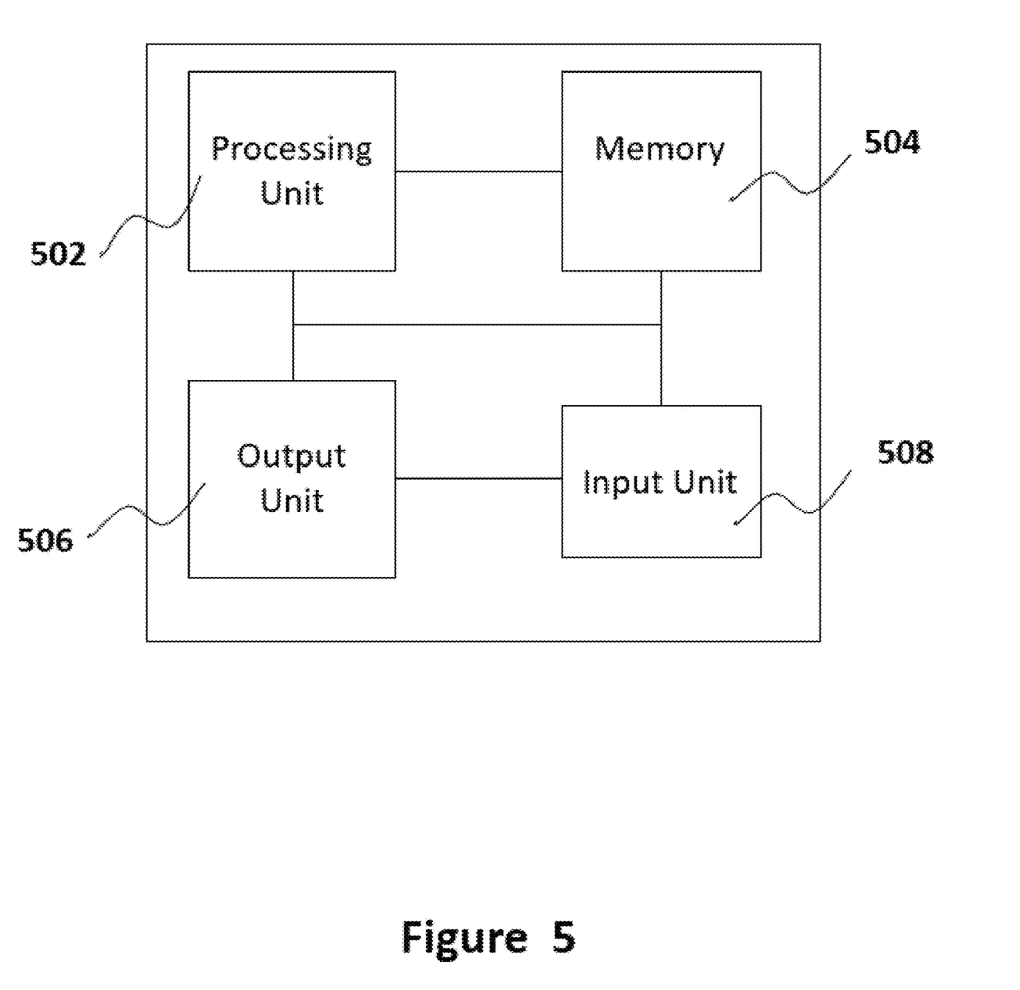
FIG. 5 illustrates a diagram of a computer environment according to an exemplary embodiment of the present subject matter.

FIG. 5 illustrates computer environment according to an embodiment of the present subject matter. The system is implemented in a computer environment comprising a processor unit 502 connected to a memory 504. The computer environment may have additional components including one or more communication channels, one or more input devices, and one or more output devices. The processor unit 502 executes program instructions and may include a computer processor, a microprocessor, a microcontroller, and other devices or arrangements of devices that are capable of implementing the steps that constitute the method of the present subject matter. The memory 504 stores an operating system, program instructions, business requirements, pre-defined codes and configurations, and predefined rules.

The input unit 508 may include, but not limited to, a keyboard, mouse, pen, a voice input device, a scanning device, or any other device that is capable of providing input to the computer system. In an embodiment of the present subject matter, the input unit 508 may be a sound card or similar device that accepts audio input in analog or digital form. The output unit 506 may include, but not limited to, a user interface on CRT or LCD screen, printer, speaker, CD/DVD writer, or any other device that provides output from the computer system.

It will be understood by those skilled in the art that the figures are only a representation of the structural components and process steps that are deployed to provide an environment for the solution of the present subject matter discussed above and does not constitute any limitation. The specific components and method steps may include various other combinations and arrangements than those shown in the figures.

The term exemplary is used herein to mean serving as an example. Any embodiment or implementation described as exemplary is not necessarily to be construed as preferred or advantageous over other embodiments or implementations. Further, the use of terms such as including, comprising, having, containing and variations thereof, is meant to encompass the items/components/process listed thereafter and equivalents thereof as well as additional items/components/process.

Although the subject matter is described in language specific to structural features and/or acts, it is to be understood that the subject matter defined in the claims is not necessarily limited to the specific features or process as described above. In fact, the specific features and acts described above are disclosed as mere examples of implementing the claims and other equivalent features and processes which are intended to be within the scope of the claims.

What claimed is:

1. A method for generating a required feature output by providing a FaaS (Function-as-a-Service) based feature library using a DAG (Directed Acyclic Graph), the method comprising:
   configuring a processing unit, the processing unit executing a plurality of computer instructions stored in a memory for:
   configuring a feature library to store logic codes generated for a plurality of features;
   deploying the feature library on a FaaS engine;
   receiving, by the FaaS engine, at least one feature selection configuration from a user;
   extracting, by the FaaS engine, raw data from at least one resource adapter connected to the FaaS engine;
   using the DAG for implementing at least one transformation based on the at least one feature selection configuration; and
   generating the required feature output based on the at least one transformation.

2. The method of claim 1, wherein each of the plurality of features is derived from at least one set of data available in at least one raw data source.

3. The method of claim 2, wherein the FaaS engine has access to the at least one raw data source to extract the at least one set of data for deriving the plurality of features.

4. The method of claim 1, wherein the plurality of features includes at least one of: raw data or developed features.

5. The method of claim 1, wherein a new tag for stored features is released for facilitating new runs of the stored features.

6. The method of claim 5, wherein the stored features are selected using a configurable input for future runs.

7. A system for generating a required feature output by providing a FaaS (Function-as-a-Service) based feature library using a DAG (Directed Acyclic Graph), the system comprising:
- a memory and
- a processing unit, the processing unit configured to execute a plurality of computer instructions stored in the memory for:
  - configuring a feature library to store logic codes generated for a plurality of features;
  - deploying the feature library on a FaaS engine;
  - receiving, by the FaaS engine, at least one feature selection configuration from a user;
  - extracting, by the FaaS engine, raw data from at least of the connected resource adapters;
  - using the DAG for implementing at least one transformation based on the at least one feature selection configuration; and
  - generating the required feature output based on the at least one transformation.

8. The system of claim 7, wherein each of the plurality of features is derived from at least one set of data available in at least one raw data source.

9. The system of claim 8, wherein the FaaS engine has access to the at least one raw data source to extract the at least one set of data for deriving the plurality of features.

10. The system of claim 7, wherein the plurality of features includes at least one of: raw data or developed features.

11. The system of claim 7, wherein a new tag for stored features is released for facilitating new runs of the stored features.

12. The system of claim 11, wherein the stored features are selected using a configurable input for future runs.

\* \* \* \* \*